Patented Oct. 24, 1950

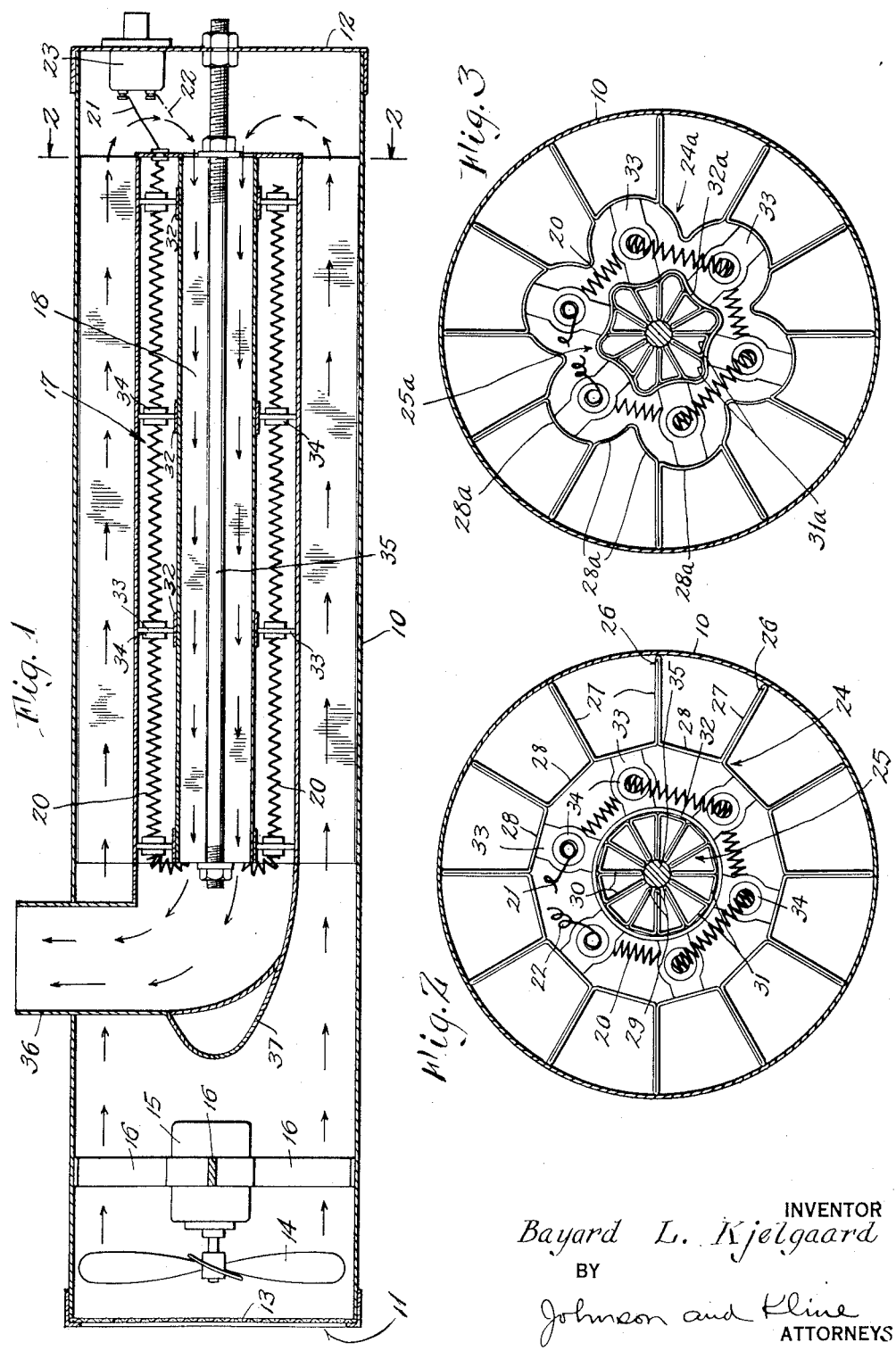

2,527,013

UNITED STATES PATENT OFFICE 2,527,013

INFRARED HEATER

Bayard L. Kjelgaard, South Norwalk, Conn.

Application October 17, 1947, Serial No. 780,481

18 Claims. (Cl. 219—39)

This invention relates to infra-red electric heaters, and more particularly to heaters of this type, which are adapted for warming air.

An object of the invention is to provide an improved infra-red electric heater wherein a highly efficient transfer of heat is effected between the infra-red generator and a heat-absorbing and transmitting structure.

Another object of the invention is to provide an improved infra-red electric air heater of the forced draft type, the said heater being so organized and constructed as to provide for extreme efficiency in imparting heat to the air stream being discharged therefrom, to the end that the greatest percentage of the input energy to the heater is transferred to the air and the least percentage dissipated in leakage and non-useful heat.

A further object of the invention is to provide an improved infra-red heater as characterized above which is extremely inexpensive and economical to manufacture and is reliable in operation over an extended period of time.

In accomplishing these objects the invention provides a novel structure comprising an elongate tubular casing, which is preferably of cylindrical shape, the said casing having an air inlet at one end and adjacent the inlet having forced-draft means in the form of a power-driven fan by which air is sucked into the casing and forced therethrough to the other end. The casing contains a novel elongate heating chamber and air duct assemblage which extends longitudinally thereof and is spaced from the side walls of the casing and also from the casing end opposite the fan, which end is provided with an airtight closure. The heating chamber and air duct assemblage comprises an annular chamber of elongate shape; that is, the chamber has a relatively great axial length as compared with its transverse dimensions. Within the annular chamber electric heating coils are provided, from which infra-red rays emanate. The annular chamber containing the heating coils is arranged so that the axial opening therethrough constitutes an air duct whereby air may be forced through it axially from one end to the other. The end of the heating chamber adjacent the closure of the casing is closed so as to be substantially airtight, and at the other end of the heating chamber the axial opening or bore thereof is connected with an outlet or discharge pipe which extends transversely and outwardly through a side wall of the casing. By this organization air which is sucked into the casing and forced past the side walls thereof toward the closed casing end is made to travel, after reaching the said closure, in a reverse direction through the axial air duct provided by the bore of the heating chamber, and thence out through the transversely extended outlet or discharge pipe. The heating chamber has a plurality of radially extended fins projecting outwardly therefrom and engaging the inner walls of the casing, and also has a plurality of radial fins in its bore projecting inwardly toward the axis of the chamber. Also, in accordance with the invention, the inner walls of the heating chamber, which are exposed to the infra-red rays from the heating coils, are coated with a dark-hued and preferably dead black coating having a flat or non-shiny finish.

This provides for the maximum amount of heat from the infra-red heater being absorbed by the walls of the heating chamber, and being transmitted from the said walls to the inwardly and outwardly extending fins. The air which is forced through the casing and through the interior opening of the heating chamber, being in intimate contact with the radial fins thereof, has a maximum amount of heat imparted to it. Moreover, the cool air which is forced into the casing is made to first traverse the area immediately adjacent the inside casing walls before its temperature becomes very high, the air being thereafter fully heated by its transversal of the bore of the heating chamber. Therefore the casing walls have a minimum amount of heat imparted to them, since they are in contact with the incoming cool air, and as a consequence the heat dissipation from the casing walls is held at an extremely low value. By this organization an extremely high efficiency is obtained in imparting heat from the heating coils to the air prior to its leaving the casing, all with a minimum of heat being dissipated from the casing walls and serving no useful purpose.

In a modification of the invention the exterior and interior walls of the heating chamber are formed to have a semi-cylindrical shape centered about the heating coils, which extend longitudinally thereof, so as to cause the infra-red rays of the coils to strike the walls of the chamber along normal lines. This results in an increase in the absorption of heat from the heating coils by the walls of the heating chamber, further increasing the efficiency of the heater.

Other features and advantages will hereinafter appear.

In the accompanying drawings:

Figure 1 is a central longitudinal sectional view taken through the improved infra-red heater of the invention.

Fig. 2 is a transverse section taken on line 2—2 of Fig. 1, and

Fig. 3 is a view like Fig. 2 but showing an infra-red heater where the inner and outer walls of the heating chamber are of semi-cylindrical shape, thereby causing the infra-red rays to strike the walls along normal lines.

Referring to Figs. 1 and 2, the improved infra-red electric air heater of this invention comprises an outer casing 10, which is preferably of cylindrical shape, having an open end 11 and a closed end 12. At the open end 11 an air-admitting screen 13 is secured, behind which an air-propelling fan 14 and electric motor 15 are provided, the motor being mounted on radial struts 16 secured to the side walls of the casing 10.

As indicated by the arrows in Fig. 1, the fan 14 sucks air into the casing 10 and forces the air longitudinally thereof toward the end closure 12.

A novel heating chamber 17 is provided within the casing 10 to extend longitudinally thereof, the said chamber being preferably formed by a sheet metal structure which has a central longitudinal opening or bore 18 constituting an air duct, the chamber having an annular shape generally, and being occupied by electric heating coils 20.

As shown in Figs. 1 and 2, the major portions of the coils 20 extend longitudinally in the chamber 17 in squirrel-cage fashion and spaced relation with each other, and are connected in series at the ends of the heating chamber so as to constitute in effect a single continuous heating coil. Leads 21 and 22 from the heating coils 20 are brought out to a terminal or connector block 23 which is mounted on the end closure 12 of the casing 10.

The sheet-metal structure forming the heating chamber 17, as shown in Fig. 2, may be advantageously formed of two separate members 24 and 25, the latter member constituting the inner wall of the chamber 17 and also providing an axial opening or air duct which extends longitudinally through the chamber, and the member 24 constituting the outer wall of the heating chamber. The sheet metal forming the member 24 is folded back on itself at intervals, to provide folded edges 26, the folded-back portions of the member being juxtaposed to each other and constituting radial fins 27 extending outwardly from the heating chamber and engaging the inner side walls of the casing 10. Between the radial fins 27 the member 24 has flat portions 28 forming a many-sided polygon when viewed from the end of the chamber, the portions 28 constituting virtually a cylindrical surface which functions as the outer wall of the heating chamber 17.

The sheet metal forming the member 25 of the heating chamber is also folded back on itself at intervals to produce folded edges 29 located closely adjacent the axis of the casing 10 and the heating chamber. The folded-back portions of the member 25 constitute inwardly extending fins 30, and the portions 31 of the member 25 between the fins 30 are flat and together constitute the inner wall of the heating chamber 17, which is virtually in the shape of a cylinder also.

As shown, bands 32 are provided encircling the inner member 25 of the heating chamber 17, the said bands being connected with flat struts 33 which extend to and are joined with the flat portions 28 of the member 24. The struts 33 carry insulating beads 34 through which the heating coils 20 extend, and the struts and bands 32 provide the mounting by which the inner chamber 25 is secured to the outer member 24 of the heating chamber. The entire structure constituting the heating chamber 17, after its assembly, may be inserted longitudinally into the casing 10 prior to affixing the end closure 12 to the casing, the radial fins 27 supporting the heating chamber in spaced relation to the center of the heating chamber structure, inside of the folded edges 29, and is secured to the heating chamber structure and to the end closure 12 of the casing by nuts, as shown, to rigidly mount the heating chamber against longitudinal movement. Adjacent the fan motor 16, an outlet or discharge pipe 36 is provided, extending transversely through the side wall of the casing 10, the said pipe being connected with the edges of the flat portions 28 of the heating chamber member 24 and having an airtight connection therewith. A nose piece 37 is provided on the outlet pipe 36 to aid in the distribution of the air from the fan 14, so that the air is fairly uniformly divided between the radial fins 27.

In accordance with the invention the inside surfaces of the portions 28 of the heating chamber structure, and the outside surfaces of the portions 31 of the structure are coated with a dark-hued and preferably dead black paint which dries with a flat, non-shiny surface. By so coating the surfaces of the heating chamber 17 the infra-red rays emanating from the heating coils 20 are more readily absorbed and the heat therefrom is more efficiently imparted to the walls of the heating chamber and to the radial fins 27 and 30 thereof. If desired a slight amount of blue may be added to the paint, the addition of the blue having been found advantageous and resulting in a greater absorption of heat of the infra-red rays.

As shown in Fig. 1, cool air which is forced into the casing by the fan 14 first travels between the radial fins 27 and is in contact with the inside wall surface of the casing 10. This air reaches the end closure 12, which reverses its flow so that the air is forced through the inside opening or bore 18 of the heating chamber structure, the air passing between the radial fins 30 in said bore and being finally discharged from the outlet pipe 36. I have found that by this organization an extremely efficient exchange of heat is effected between the heating coils 20 and the air which is passed into the casing and out of the discharge pipe 36, with a minimum of heat dissipation from the casing walls, which latter represents lost or non-useful heat. I attribute this high efficiency to the novel construction whereby the walls of the casing 10 are subjected to the incoming cool air before the latter becomes greatly heated, and whereby the bore of the heating chamber 17 carries the partly warmed air while it attains its greatest or highest temperature. Also, I attribute the high efficiency of my heater to the provision of the dark-hued or dead black, flat and non-shiny surfaces on the walls of the heating chamber 17, whereby such surfaces absorb the infrared rays to the greatest extent and transfer the heat therefrom to the radial fins 27 and 30 between which the air to be heated passes.

It will be seen that the structure of my improved infra-red forced-draft heater is extremely simple, the various parts being capable of economical fabrication.

A modification of the invention is shown in

Fig. 3 wherein the inner and outer wall portions of the heating chamber 17, herein designated 28a and 31a, are formed to have cylindrical shapes so that the infra-red rays travelling to said walls strike them along normal or perpendicular lines, thereby providing for a maximum of absorption and resulting in an increased heat pick-up from the rays. In the construction shown in Fig. 3 the inner member 25a of the heating chamber 17 is encompassed at intervals by bands 32a which have roughly a star shape.

Parts of the heater of the modification shown in Fig. 3 which correspond to the parts of Fig. 2 have been given corresponding characters.

The end of the heating chamber 17 adjacent the outlet pipe 36 may be closed, if desired, or it may be open and communicate with the pipe as shown, in which latter case the air being discharged through the pipe will be subjected to radiation from the coils 20 especially at the ends thereof, and also convection currents will be set up within the chamber 17 by a Venturi action so that hot air therefrom will mix with the flow through the pipe, adding to the heat of the discharged air.

It will be understood, referring to Figs. 2 and 3 that the outer heating chamber members 24 and 24a may be considered as each being made up of a plurality of separate members having flanges, thereby constituting channels of substantially U-section or modified U-section the sides of the channels touching each other broadside to produce the fins 27, and that the inner heating chamber members 25 and 25a may also be made up of a plurality of separate members having flanges, thereby constituting channels of substantially U-section or modified U-section, with the sides of the channels touching each other broadside to produce the fins 30.

Variations and modifications may be made within the scope of this invention and portions of the improvements may be used without others.

I claim:

1. An electric heater comprising a heating element for producing infra-red rays; and a member located adjacent the heating element to receive heat therefrom, said member having a dark-hued, dull and non-shiny surface exposed to the heating element to provide for a maximum amount of absorption by said member of the infra-red rays from the heating element, said surface being concave, at all points substantially equispaced from the element and so arranged that the said infra-red rays travel toward substantially all portions of the surface along lines normal thereto, thereby to further increase the absorption of the rays by the member.

2. An electric heater comprising an elongate heating element for producing infra-red rays; a member located adjacent the heating element to receive heat therefrom, said member having a dark-hued, dull and non-shiny surface exposed to the heating element to provide for a maximum amount of absorption by said member of the infra-red rays from the heating element, said surface being concave, substantially cylindrical and at all points substantially equispaced from the element, and so arranged that the said infra-red rays travel toward substantially all portions of the surface along lines normal thereto, thereby to further increase the absorption of the rays by the member; and integral heat-radiating fins projecting from the opposite surface of said member.

3. An electric heater comprising an elongate heating element for producing infra-red rays; a pair of members located on and extending along opposite sides of the heating element to receive heat therefrom, said members having dark-hued, dull and non-shiny surfaces directly exposed to the heating element to provide for a maximum amount of absorption by said members of the infra-red rays from the heating element, and said surfaces being concave and so arranged that the said infra-red rays travel toward the surfaces along lines normal thereto, thereby to further increase the absorption of the rays by the members.

4. An electric heater comprising an elongate heating element for producing infra-red rays; a pair of members located on opposite sides of the heating element to receive heat therefrom, said members having dark-hued, dull and non-shiny surfaces exposed to the heating element to provide for a maximum amount of absorption by said members of the infra-red rays from the heating element, and said surfaces being concave and substantially cylindrical, and so arranged that the said infra-red rays travel toward the surfaces along lines normal thereto, thereby to further increase the absorption of the rays by the members.

5. An electric heater comprising an elongate spirally wound heating element for producing infra-red rays; and a member located adjacent the heating element to receive heat therefrom, said member having a dark-hued, dull and non-shiny surface exposed to the heating element to provide for a maximum amount of absorption by said member of the infra-red rays from the heating element, said surface being concave and substantially cylindrical, and at all points equispaced from the element so that the said infra-red rays travel toward the surface along lines normal thereto, thereby to further increase the absorption of the rays by the member.

6. An electric heater comprising a heating element for producing infra-red rays; and a member located adjacent the heating element to receive heat therefrom, said member having a dark-hued, dull and non-shiny cylindrical surface exposed to and equispaced from the heating element to receive infra-red rays therefrom along lines normal to the surface and thereby provide for a maximum amount of absorption by said member of the infra-red rays from the heating element; fins projecting from the member and arranged to receive heat therefrom; and means for passing air past said fins to be heated thereby.

7. An electric heater comprising a heating element for producing infra-red rays; a pair of members located on opposite sides of the heating element to receive heat therefrom, said heating element interposed between the members and said members having dark-hued, dull and non-shiny surfaces exposed to the heating element to provide for a maximum amount of absorption by said members of the infra-red rays from the heating element; fins projecting from the members and arranged to receive heat therefrom; and means for passing air past the fins of one member and thereafter past the fins of the other member, to be heated by said fins.

8. An electric heater comprising a pair of heating elements for producing infra-red rays, said elements being located in spaced relation; pairs of members associated with the heating elements respectively, the members of each pair being disposed on opposite sides of the associated elements to receive heat therefrom and said members having dark-hued, dull and non-shiny surfaces exposed to the heating elements to provide for a maximum amount of absorption by said members of the infra-red rays from the elements; fins projecting from the members, the fins of one member of each pair being located in exposed relation to each other; and means for passing air past the fins of the other members of the pairs and thereafter past the said fins which are exposed to each other, to heat the said air.

9. An electric heater comprising a plurality of elongate heating elements for producing infra-red rays, said elements being disposed in squirrel-cage fashion about an axis; pairs of members associated with the heating elements respectively, the members of each pair being disposed on opposite sides of the associated elements to receive heat therefrom, and said members having dark hued, dull and non-shiny surfaces exposed to the heating elements to provide for a maximum amount of absorption by said members of the infra-red rays from the elements; fins projecting from the members, the fins of one member of each pair being located in exposed relation to each other around the said axis of the heating elements; and means for passing air past the fins of the other members of the pairs and thereafter past the said fins which are exposed to each other, to heat the said air.

10. An electric heater comprising a plurality of elongate heating elements for producing infra-red rays, said elements being disposed in squirrel-cage fashion about an axis; pairs of members associated with the heating elements respectively, the members of each pair being disposed on opposite sides of the associated elements to receive heat therefrom, and said members having dark-hued, dull and non-shiny surfaces exposed to the heating elements to provide for a maximum amount of absorption by said members of the infra-red rays from the elements; fins projecting radially from the members, the fins of one member of each pair being located in exposed relation to each other around the said axis of the heating elements; a substantially cylindrical casing surrounding the members and extending closely adjacent the outer extremities of the fins on the other members of the pairs and means for passing air through the casing and past the fins adjacent the casing, and thereafter past the fins around the said axis, thereby to heat the said air.

11. An electric heater comprising a plurality of elongate heating elements for producing infra-red rays, said elements being disposed in squirrel-cage fashion about an axis; pairs of members associated with the heating elements respectively, the members of each pair being disposed on opposite sides of the associated elements to receive heat therefrom, and said members having dark-hued, dull and non-shiny surfaces exposed to the heating elements to provide for a maximum amount of absorption by said members of the infra-red rays from the elements, said surfaces being concave and so arranged that the said infra-red rays travel toward the surfaces along lines normal thereto, thereby to further increase the absorption of the rays by the members; fins projecting from the members, the fins of one member of each pair being located in exposed relation to each other around the said axis of the heating elements; and means for passing air past the fins of the other members of the pairs and thereafter past the said fins which are exposed to each other, to heat the said air.

12. An electric heater comprising a plurality of elongate heating elements for producing infra-red rays, said elements being disposed in squirrel-cage fashion about an axis; pairs of members associated with the heating elements respectively, the members of each pair being disposed on opposite sides of the associated elements to receive heat therefrom, and said members having dark-hued, dull and non-shiny surfaces exposed to the heating elements to provide for a maximum amount of absorption by said members of the infra-red rays from the elements; fins projecting radially from the members, the fins of one member of each pair being located in exposed relation to each other around the said axis of the heating elements; a substantially cylindrical elongate casing surrounding the members and extending closely adjacent the outer extremities of the fins on the other members of the pairs; a fan in one end of the casing for forcing air therethrough and past the fins adjacent the casing; and a closure at the other end of the casing for diverting the air through the fins around the said axis.

13. An electric heater comprising a plurality of elongate heating elements for producing infra-red rays, said elements being disposed in squirrel-cage fashion about an axis; pairs of members associated with the heating elements respectively, the members of each pair being disposed on opposite sides of the associated elements to receive heat therefrom, and said members having dark-hued, dull and non-shiny surfaces exposed to the heating elements to provide for a maximum amount of absorption by said members of the infra-red rays from the elements; fins projecting radially from the members, the fins of one member of each pair being located in exposed relation to each other around the said axis of the heating elements; a substantially cylindrical casing surrounding the members and extending closely adjacent the outer extremities of the fins on the other members of the pairs; and an outlet pipe for said heated air, extending transversely out of said casing.

14. In an electric heater, means providing an elongate annular chamber having an axially extending opening therethrough and having an axial length in excess of its greatest diameter, said chamber being closed at one end; heating elements in said chamber, for producing infra-red rays, the interior surfaces of the chamber-providing means being dark-hued, dull and non-shiny to provide for maximum absorption of said infra-red rays by said means; fins extending from said chamber-providing means radially inward into said axially-extending opening and radially outward; an elongate, substantially cylindrical casing surrounding said chamber-providing means and said radial fins extending outwardly therefrom, the end of the casing adjacent the closed end of the said chamber having a closure spaced from said closed chamber end; a fan at the other end of the casing for forcing air therethrough past the said outwardly extending fins and toward the closed end of the casing, said casing closure diverting said air through the axial opening of the chamber past the inwardly extending fins; and an outlet pipe connected to that end of the axial opening, extending through the chamber, which is remote from the closed end of the chamber, said pipe extending transversely through and out of the casing.

15. In an electric heater, means providing an elongate annular chamber having an axially extending opening therethrough and having an axial length in excess of its greatest diameter, said chamber being closed at one end; heating elements disposed in squirrel-cage fashion in said chamber, for producing infra-red rays, the interior surfaces of the chamber-providing means being dark-hued, dull and non-shiny to provide for maximum absorption of said infra-red rays by said means and the walls of said means being substantially cylindrical and so arranged that the said infra-red rays travel toward the dark-hued surfaces along lines normal thereto, thereby to further increase the absorption of the rays by said means; fins extending from said chamber-providing means radially inward into said axially-extending opening and radially outward; an elongate, substantially cylindrical casing surrounding said chamber-providing means and said radial fins extending outwardly therefrom, the end of the casing adjacent the closed end of the said chamber having a closure spaced from said closed chamber end; a fan at the other end of the casing for forcing air therethrough past the said outwardly extending fins and toward the closed end of the casing, said casing closure diverting said air through the axial opening of the chamber past the inwardly extending fins; and an outlet pipe connected to that end of the axial opening, extending through the chamber, which is remote from the closed end of the chamber, said pipe extending transversely through and out of the casing.

16. In an electric heater, means providing an elongate annular chamber having an axially extending opening therethrough and having an axial length in excess of its greatest diameter, said chamber being closed at one end; heating elements in said chamber, for producing infra-red rays, the interior surfaces of the chamber-providing means being dark-hued, dull and non-shiny to provide for maximum absorption of said infra-red rays by said means; fins extending from said chamber-providing means radially inward into said axially-extending opening and radially outward; an elongate, substantially cylindrical casing surrounding said chamber-providing means and said radial fins extending outwardly therefrom, the end of the casing adjacent the closed end of the said chamber having a closure spaced from said closed chamber end; a fan at the other end of the casing for forcing air therethrough past the said outwardly extending fins and toward the closed end of the casing, said casing closure diverting said air through the axial opening of the chamber past the inwardly extending fins; and an outlet pipe connected to that end of the axial opening, extending through the chamber, which is remote from the closed end of the chamber, said pipe extending transversely through and out of the casing, the end of the chamber adjacent the outlet pipe communicating with said pipe.

17. In an electric heater, means providing an elongate annular chamber having an axially extending opening therethrough and having an axial length in excess of its greatest diameter, said chamber being closed at one end; heating elements in said chamber, for producing infra-red rays, the interior surfaces of the chamber-providing means being dark-hued, dull and non-shiny to provide for maximum absorption of said infra-red rays by said means; fins extending from said chamber-providing means radially inward into said axially-extending opening and radially outward; an elongate, substantially cylindrical casing surrounding said chamber-providing means and said radial fins extending outwardly therefrom, the end of the casing adjacent the closed end of the said chamber having a closure spaced from said closed chamber end; a fan at the other end of the casing for forcing air therethrough past the said outwardly extending fins and toward the closed end of the casing, said casing closure diverting said air through the axial opening of the chamber past the inwardly extending fins; and an outlet pipe connected to that end of the axial opening, extending through the chamber, which is remote from the closed end of the chamber, said pipe extending transversely through and out of the casing, the end of the chamber adjacent the outlet pipe being partitioned from the inside of the casing.

18. An electric heater comprising a pair of heating elements for producing infra-red rays, said elements being located in spaced relation; pairs of members associated with the heating elements respectively, the members of each pair being disposed on opposite sides of the associated elements to receive heat therefrom and said members having dark-hued, dull and non-shiny surfaces directly exposed to the heating elements to provide for a maximum amount of absorption by said members of the infra-red rays from the elements; fins projecting from the members, the fins of one member of each pair being located in exposed relation to each other; and means for passing air past the fins of the members of both pairs, to heat the said air.

BAYARD L. KJELGAARD.

REFERENCES CITED

The following references are of record in the file of this patent:

UNITED STATES PATENTS

| Number | Name | Date |
| --- | --- | --- |
| 1,227,324 | Russell et al. | May 22, 1917 |
| 1,318,237 | Sordi | Oct. 7, 1919 |
| 1,694,351 | Long | Dec. 4, 1928 |
| 1,705,812 | Fisher | Mar. 19, 1929 |
| 1,713,013 | Wandless | May 14, 1929 |
| 1,754,232 | Fisher | Apr. 15, 1930 |
| 1,782,825 | Holinger | Nov. 25, 1930 |
| 2,042,264 | Levenhagen | May 26, 1936 |
| 2,379,820 | Mendez | July 3, 1945 |